US008812558B1

(12) United States Patent
Qian (10) Patent No.: US 8,812,558 B1
(45) Date of Patent: Aug. 19, 2014

(54) PUSH NOTIFICATION OF UPDATES TO ANTIVIRUS PROGRAMS (75) Inventor: Haichuan Qian, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 2549 days.

(21) Appl. No.: 11/272,926

(22) Filed: Nov. 14, 2005

(51) Int. Cl.
*G06F 17/30* (2006.01)

(52) U.S. Cl.
USPC .......................... 707/803; 707/792; 707/809

(58) Field of Classification Search
None
See application file for complete search history.

(56) References Cited

U.S. PATENT DOCUMENTS

| 6,123,737 | A  | * | 9/2000  | Sadowsky ................... 717/173 |
| 6,269,456 | B1 | * | 7/2001  | Hodges et al. ................ 714/38 |
| 6,654,746 | B1 | * | 11/2003 | Wong et al. ................... 707/10 |
| 6,738,799 | B2 | * | 5/2004  | Dickenson ................... 709/203 |
| 6,785,820 | B1 | * | 8/2004  | Muttik et al. ................. 726/24 |
| 6,895,513 | B1 | * | 5/2005  | Balasubramaniam et al. . 726/24 |
| 7,080,000 | B1 | * | 7/2006  | Cambridge ................... 703/21 |
| 7,120,684 | B2 | * | 10/2006 | Lawing et al. ............... 709/223 |
| 2002/0077080 | A1 | * | 6/2002  | Greene ....................... 455/412 |
| 2003/0200541 | A1 | * | 10/2003 | Cheng et al. ................. 717/169 |
| 2005/0204353 | A1 | * | 9/2005  | Ji ................................. 717/168 |
| 2006/0069753 | A1 | * | 3/2006  | Hu et al. ...................... 709/220 |
| 2006/0075001 | A1 | * | 4/2006  | Canning et al. ............. 707/203 |
| 2006/0101400 | A1 | * | 5/2006  | Capek et al. ................. 717/120 |
| 2006/0130037 | A1 | * | 6/2006  | Mackay ....................... 717/168 |

OTHER PUBLICATIONS

Puneet Gupta, "Short Message Service: What, How and Where?", Wireless Developer Network, [on line], [retrieved on Oct. 4, 2005]. Retrieved from the Internet <URL:http://www.wirelessdevnet.com/channels/sms/features/sms.html>.
Now.SMS, Home of the Now SMS/MMS Gateway, [on line], [retrieved on Oct. 5, 2005]. Retrieved from the Internet <URL:http://www.nowsms.com/documentation/ProductDocumentation/configuring_smsc_connections/GSM_Modems.htm>.
SearchDomino.com, Practical information, timely trends and technology insight on applications for collaboration. [on line], [retrieved from the Internet <URL:http://searchdomino.techtarget.com/sDefinition/0,.sid4_gci934583,00.html>.

* cited by examiner

*Primary Examiner* — Mohammad S Rostami
(74) *Attorney, Agent, or Firm* — Okamoto & Benedicto LLP (57) ABSTRACT

In one embodiment, updates to antivirus programs are delivered to customer client computers by pushing an update notification from a support server computer to the customer client computers. To prevent firewalls or other network security mechanism from blocking the notification, the notification may be pushed to the customer client computers by instant messaging, short messaging, or through another customer client computer, for example. After a customer client computer receives the notification, the customer client computer may request the support server computer for the updates. In response to the request, the support server computer may provide updates to the customer client computer.

5 Claims, 12 Drawing Sheets

PUSH NOTIFICATION OF UPDATES TO ANTIVIRUS PROGRAMS

BACKGROUND OF THE INVENTION

1. Field of the Invention

The present invention relates generally to computer systems and more particularly, but not exclusively, to methods and apparatus for distributing updates for computer security and screening products.

2. Description of the Background Art

Computer viruses, worms, Trojans, and spyware are examples of malicious codes that have plagued computer systems throughout the world. Although there are technical differences between each type of malicious code, malicious codes are collectively referred to herein as "viruses", as is common in the industry. Generally speaking, a computer virus can corrupt or delete important files, send e-mails without user authorization, render a computer inoperable, or cause other types of damage to a computer. Computers may incorporate antivirus programs as a protective measure against viruses.

A typical antivirus program uses a pattern file to scan a computer for viruses. The pattern file includes the patterns (also referred to as "signatures") of known viruses, algorithms for detecting viruses, and/or other antivirus-related information. The antivirus program uses the pattern file as a reference in determining if data, such as those in files, contain a virus. Antivirus programs, including their pattern files, may be continually updated to keep up with new viruses. These updates to antivirus programs are typically delivered from an antivirus support server computer to a customer client computer over a computer network, such as the Internet. The antivirus program in the customer client computer periodically polls the support server computer for new updates. Although workable, this approach has a major limitation. Updates need to be timely delivered to the client computer in the event of a new virus outbreak. If the time interval between polling is configured to be short, the support server computer will require a large amount of bandwidth to be able to serve a lot of customer client computers. If the time interval between polling is large, timely delivery of updates is compromised. What is needed is an improved technique for timely delivery of updates to computer security and screening products, such as antivirus programs in customer client computers.

SUMMARY

In one embodiment, updates to antivirus programs are delivered to customer client computers by pushing an update notification from a support server computer to the customer client computers. To prevent firewalls or other network security mechanism from blocking the notification, the notification may be pushed to the customer client computers by instant messaging, short messaging, or through another customer client computer, for example. After a customer client computer receives the notification, the customer client computer may request the support server computer for the updates. In response to the request, the support server computer may provide the updates to the customer client computer.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Embodiments of the present invention are described in the context of antivirus programs for illustration purposes only. In light of the present disclosure, those of ordinary skill in the art will appreciate that embodiments of the present invention may be generally employed in computer security and screening applications. For example, embodiments of the present invention may also be employed in anti-phishing and anti-spam applications.

Figure 1:
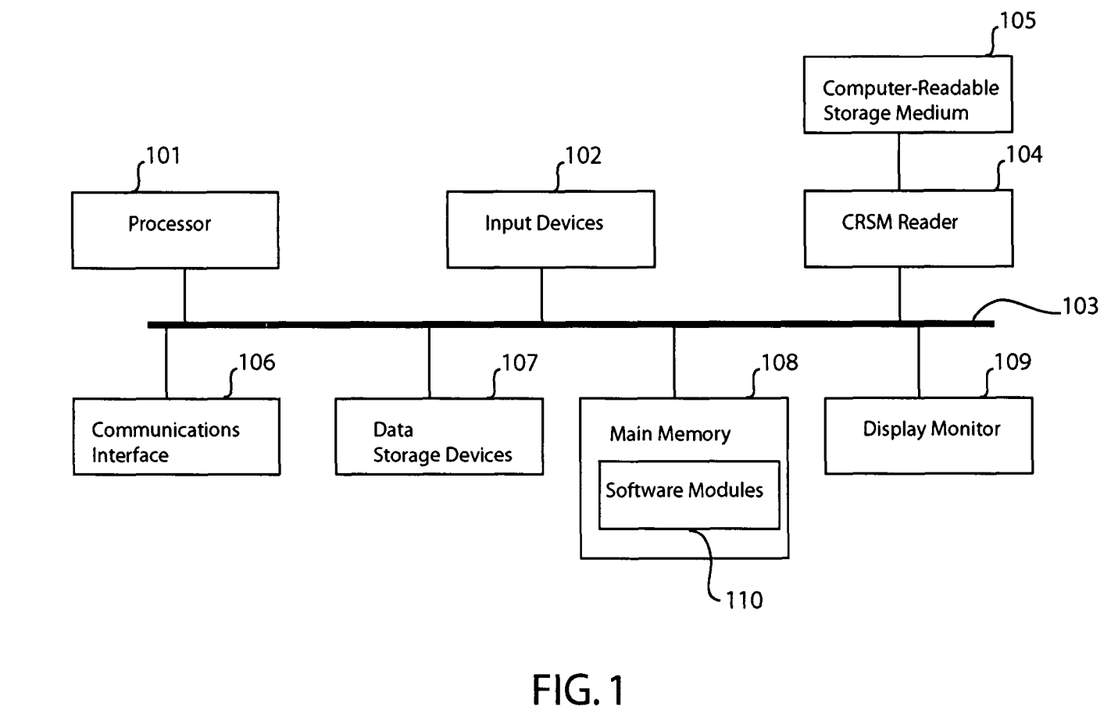
FIG. 1 shows a schematic diagram of an example computer that may be used in embodiments of the present invention.

Referring now to FIG. 1, there is shown a schematic diagram of an example computer that may be used in embodiments of the present invention. Depending on its configuration, the computer shown in the example of FIG. 1 may be employed as a client computer or a server computer, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. Software embodiments may also be received over a computer network by way of communications interface 106. In the example of FIG. 1, main memory 108 includes software modules 110, which may comprise software components of later described support server computers and customer client computers. The software modules 110 may be executed by processor 101.

In some situations, a customer client computer needing updates for its antivirus program may be behind a firewall. As is well known, most firewalls do not allow a computer outside the firewall to initiate a connection to computers within the firewall. This prevents a support server computer from pushing data, such as notification that new updates are available, to customer client computers behind firewalls. To get around this limitation, conventional techniques for delivering updates to antivirus programs involve the customer client computer initiating communication to the support server computer by polling at regular intervals. As will be more apparent below, embodiments of the present invention allow support server computers to push notifications to customer client computers when a new update is available. This enables support server computers to initiate the update delivery process, thereby advantageously allowing customer client computers to request the support server computer for updates as soon as they become available.

Figure 2:
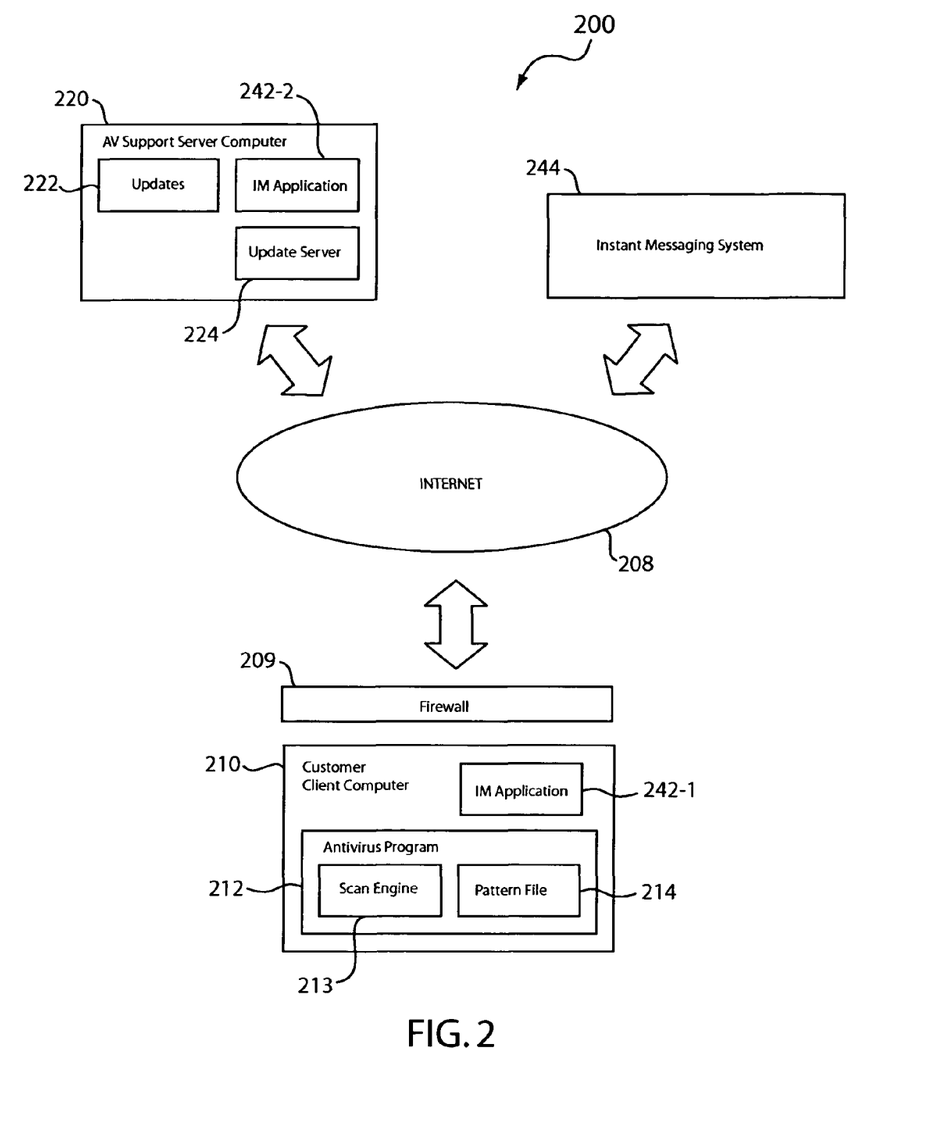
FIG. 2 schematically shows a computing environment in accordance with an embodiment of the present invention.

FIG. 2 schematically shows a computing environment 200 in accordance with an embodiment of the present invention. The computing environment 200 may include one or more customer client computers 210, antivirus support server computers 220, and instant messaging systems 244. In the example of FIG. 2, only one of each is shown for clarity of illustration. Typically, a single antivirus support server computer 220 may serve a plurality of customer client computers 210. The computers of environment 200 may communicate with one another over a public computer network 208, which in the example of FIG. 2 comprises the Internet.

A customer client computer 210 may include a computer security and screening product, such as an antivirus program 212. The antivirus program 212 may comprise a scan engine 213 and a pattern file 214. The antivirus program 212 may be a conventional antivirus program, such as those commercially available from Trend Micro, Inc. The antivirus program 212 is configured to receive updates 222 from the antivirus support server computer 220, which may comprise a server computer operated by the vendor of the antivirus program 212. The customer client computer 210 may be behind a firewall 209 or some other computer network security mechanism.

An instant messaging application 242 (i.e. 242-1, 242-2, . . . ) may comprise computer-readable program code for sending and receiving instant messages over the computer network 208. It is to be noted that instant messaging, in general, is well known. Generally speaking, instant messaging is a form of electronic communication that involves immediate correspondence between two or more users who are all online simultaneously. In the computing environment 200, computers (rather than human users) may communicate with one another by instant messaging. An instant messaging application 242-1 allows the client computer 210 to send and receive instant messages to and from the support server computer 220. Similarly, an instant messaging application 242-2 allows the support server computer 220 to send and receive instant messages to and from customer client computers 210 configured to receive updates for their antivirus programs 212. The instant messaging application 242-1 may be configured to forward received instant messages to an antivirus program 212 rather than display the instant messages on the display screen. That is, an instant message transmitted using the instant messaging application 242-2 of the support server computer 220 may be received by the instant messaging application 242-1 in the customer client computer 210 without having to display the instant message. The instant messaging application 242-1 may forward the instant message received from instant messaging application 242-2 to the antivirus program 212. An instant message may comprise one or more lines of text or other data.

In one embodiment, a notification that a new update is available is sent as an instant message by the support server computer 220 to the customer client computer 210. The instant message may comprise predetermined encoded or un-encoded text or other data indicating that an update for the antivirus program 212 is available. Upon receiving the instant message, the instant messaging application 242-1 may forward the instant message to the antivirus program 212. Upon receiving the instant message, which it recognizes as a notification, the antivirus program 212 may proceed to send the support server computer 220 a request for the update.

An instant messaging system 244 may comprise software and hardware components for providing instant messaging service to the support server computer 220 and customer client computers 210. The instant messaging system 244, the support server computer 220, and customer client computers 210 form an instant messaging network.

The support server computer 220 may comprise updates 222, an update server 224, and the previously discussed instant messaging application 242-2. In one embodiment, updates 222 comprise a file containing updates for an antivirus program 212. Updates 222 may comprise a new pattern file 214 or updates to a scan engine 213 or other components of an antivirus program 212. Updates 222 may be prepared by antivirus researchers to allow an antivirus program 212 to combat a newly discovered virus, for example. An update server 224 may comprise computer-readable program code for facilitating delivery of updates 222 to customer client computers 210. In one embodiment, the update server 224 sends out an update notification when new updates 222 become available and services request for updates received from customer client computers.

Figure 3:
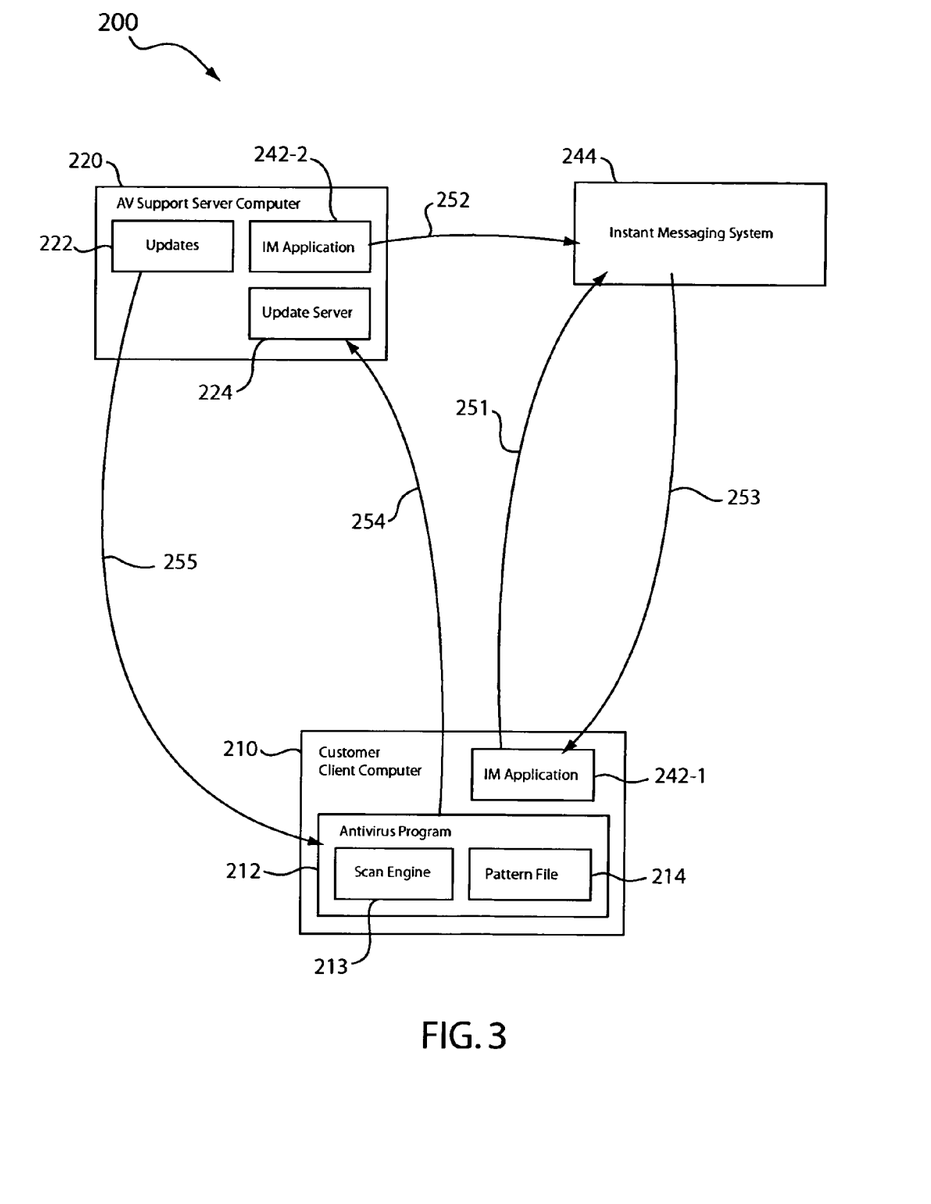
FIG. 3 shows a flow diagram of an update delivery process in the computing environment of FIG. 2 in accordance with an embodiment of the present invention.

FIG. 3 shows a flow diagram of an update delivery process in the computing environment 200 in accordance with an embodiment of the present invention. In the example of FIG. 3, communications between the computers shown are over the Internet (see FIG. 2). In one embodiment, the instant messaging application 242-1 automatically starts up upon boot-up of the customer client computer 210. Upon launching, the instant messaging application 242-1 connects to the instant messaging system 244 (arrow 251) to announce its presence. The instant messaging system 244 verifies that the computer 210 is allowed to connect to the instant messaging network and keeps the connection with the instant messaging application 242-1. Because the instant messaging connection is initiated by the customer client computer, the firewall 209 (see FIG. 2) allows a two way communication between the customer client computer 210 and the instant messaging system 244.

When new updates 222 become available for download from the support server computer 220, the update server 224 sends out a notification about the availability of the new updates 222 as an instant message using the instant messaging application 242-2. The instant messaging application 242-2 forwards the notification to the instant messaging system 244 (arrow 252), which in turn forwards the notification to the instant messaging application 242-1 (arrow 253). The instant messaging application 242-1 then forwards the notification to the antivirus program 212, which, based on the notification, finds out that new updates are available for download. Accordingly, the antivirus program 212 sends a request for updates to the update server 224 (arrow 254). In response, the update server 224 provides the updates 222 to the antivirus program 212 in the customer client computer 210 (arrow 255). The antivirus program 212 updates one or more of its components using the updates 222.

It is to be noted that the functionality of an instant messaging application 242 may be incorporated in other programs without detracting from the merits of the present invention. For example, the functionality of the instant messaging application 242-1 may be incorporated as part of the antivirus program 212.

Figure 4:
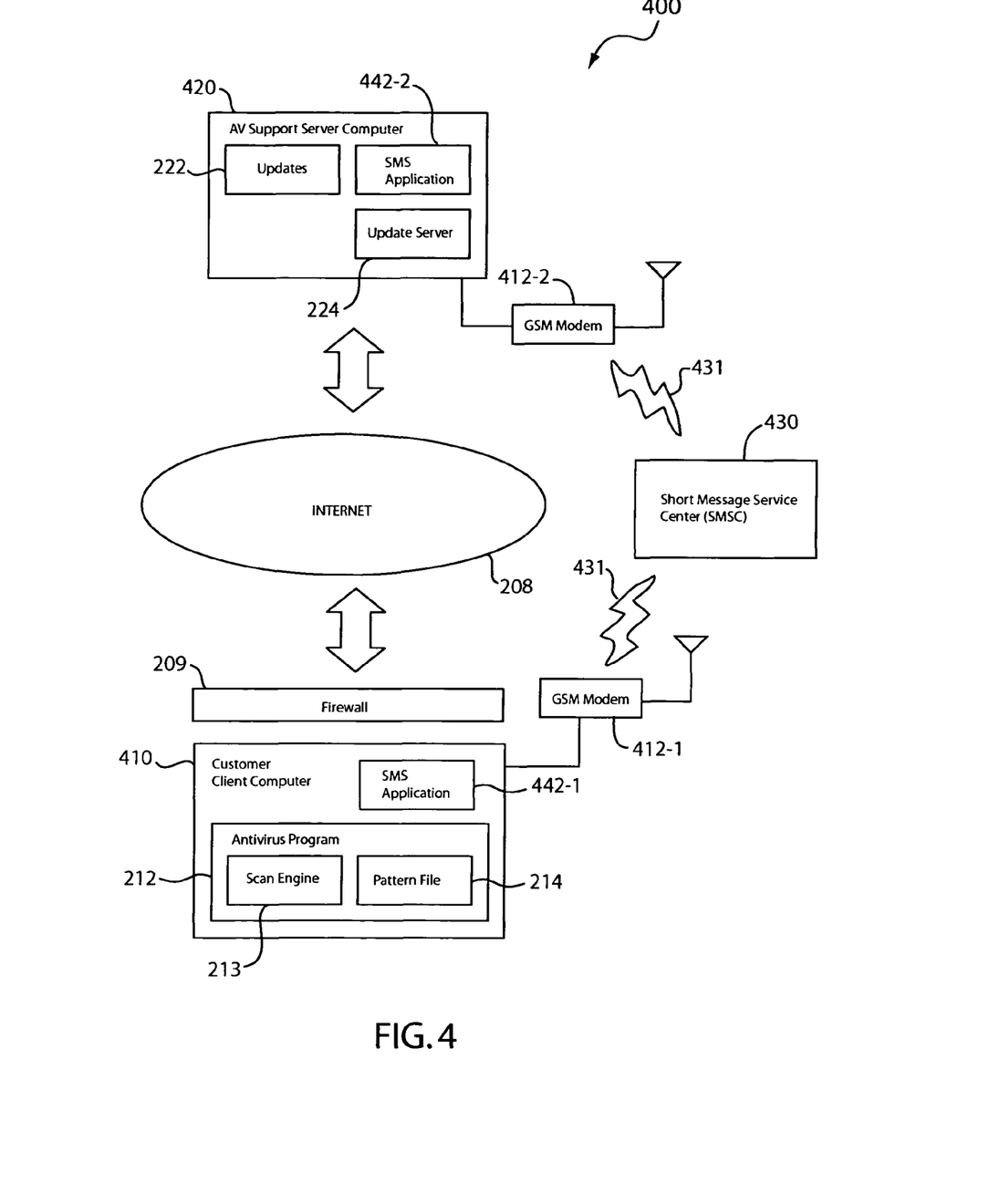
FIG. 4 shows another computing environment in accordance with an embodiment of the present invention.

FIG. 4 shows a computing environment 400 in accordance with an embodiment of the present invention. The computing environment 400 may include one or more customer client computers 410, antivirus support server computers 420, and short message service centers 430. In the example of FIG. 4, only one of each is shown for clarity of illustration. Typically, a single antivirus support server computer 420 may serve a plurality of customer client computers 410. The antivirus support server computer 420 and customer client computers 410 may communicate over the public computer network 208, which in the example of FIG. 4 comprises the Internet.

A customer client computer 410 includes the previously described antivirus program 212, which comprises a scan engine 213 and a pattern file 214. In the example of FIG. 4, the antivirus program 212 is configured to receive updates 222 from the antivirus support server computer 420, which may comprise a server computer operated by the vendor of the antivirus program 212. The customer client computer 410 may be behind a firewall 209 or some other computer network security mechanism.

A short message service (SMS) application 242 (i.e. 242-1, 242-2, ...) may comprise computer-readable program code for sending and receiving messages over wireless communication links 431. In the example of FIG. 4, the SMS applications 242 send and receive messages using modems 412 (i.e. 412-1, 412-2, ...). It is to be noted that short message service, in general, is well known. Generally speaking, a short message service allows messages (e.g. text message or binary data) to be sent and received over a wireless communications network, such as a Global System for Mobile communication (GSM), CDMA1x, WCDMA, etc. network. In the example of FIG. 4, modems 412 comprise GSM modems but may also be telephones or other communications apparatus. For example, the support server computer 420 may employ an open protocol, such as the Short Message Peer-to-Peer (SMPP) or Computer Interface For Message Distribution (CIMD) protocol, to send and receive messages instead of using the modem 412-2.

An SMS application 442-1 allows the client computer 410 to send and receive messages to and from the support server computer 420. Similarly, an SMS application 442-2 allows the support server computer 420 to send and receive messages to and from customer client computers 410 configured to receive updates for their antivirus programs 212. The SMS application 442-1 may be configured to forward messages to an antivirus program 212 rather than displaying the messages on the display screen. That is, a message transmitted using the SMS application 442-2 of the support server computer 420 may be received by the SMS application 442-1 in the customer client computer 410 without having to display the message. The SMS application 442-1 may forward the message received from the SMS application 442-2 to the antivirus program 212.

In one embodiment, a notification that a new update is available is sent as a message by the support server computer 420 to the customer client computer 410. The message may comprise predetermined encrypted text or binary data indicating that an update for the antivirus program 212 is available. Upon receiving the message, the SMS application 442-1 may forward the message to the antivirus program 212. Upon receiving the message, which it recognizes as a notification, the antivirus program 211 may proceed to send the support server computer 420 a request for the update.

The short message service center 430 may comprise infrastructure for providing short message service to the support server computer 420 and customer client computers 410. The short message service center 430, the support server computer 420, and the customer client computer 410 form a short message service network.

The support server computer 420 may comprise the previously described updates 222, update server 224, and SMS application 442-2. In the example of FIG. 4, the update server 224 sends out an update notification when new updates 222 become available and services requests for updates received from customer client computers 410. The computing environments 200 and 400 are similar except for the way a support server computer pushes data to client computers behind firewalls. In computing environment 400, the support server computer 420 sends notifications by way of a communications link that does not go through the firewall 209. More specifically, sending notifications by way of the SMS network allows the support server computer 420 to push timely notifications to the customer client computer 410.

Figure 5:
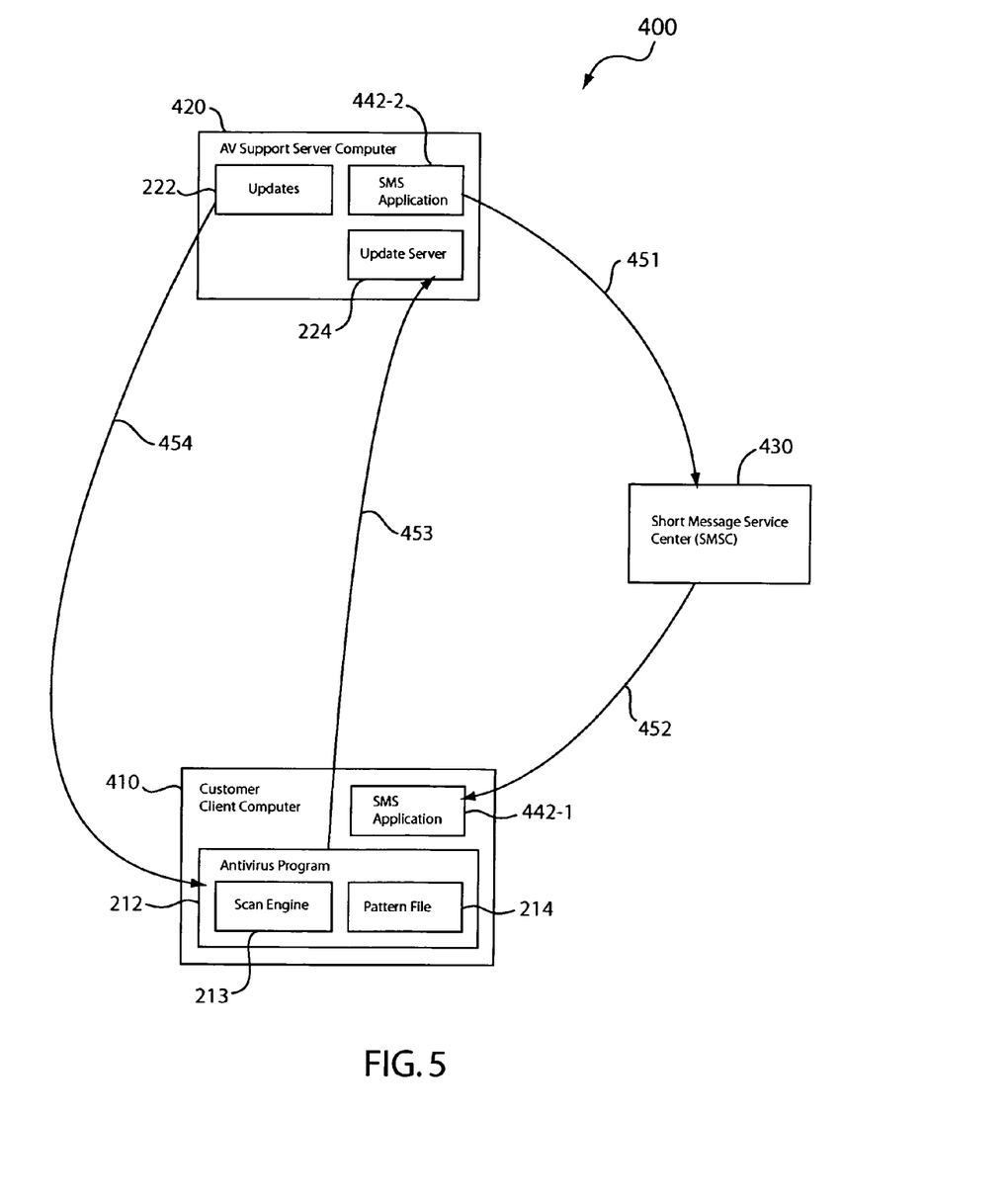
FIG. 5 shows a flow diagram of an update delivery process in the computing environment of FIG. 4 in accordance with an embodiment of the present invention.

FIG. 5 shows a flow diagram of an update delivery process in the computing environment 400 in accordance with an embodiment of the present invention. When new updates 222 become available for download from the support server computer 420, the update server 224 sends out a notification about the availability of the new updates 222 as a message using the SMS application 442-2. The SMS application 442-2 forwards the notification to the SMS application 442-1 in the customer client computer 410 over the SMS network (arrows 451 and 452). The SMS application 442-1 forwards the notification to the antivirus program 212, which, based on the notification, finds out that new updates are available for download. Accordingly, the antivirus program 212 sends a request for updates to the update server 224 (arrow 453). In response, the update server 224 provides the updates 222 to the antivirus program 212 in the customer client computer 410 (arrow 454). The antivirus program 212 updates one or more of its components using the updates 222. Note that in the example of FIG. 5, arrows 453 and 454 represent actions performed over the Internet.

Figure 6:
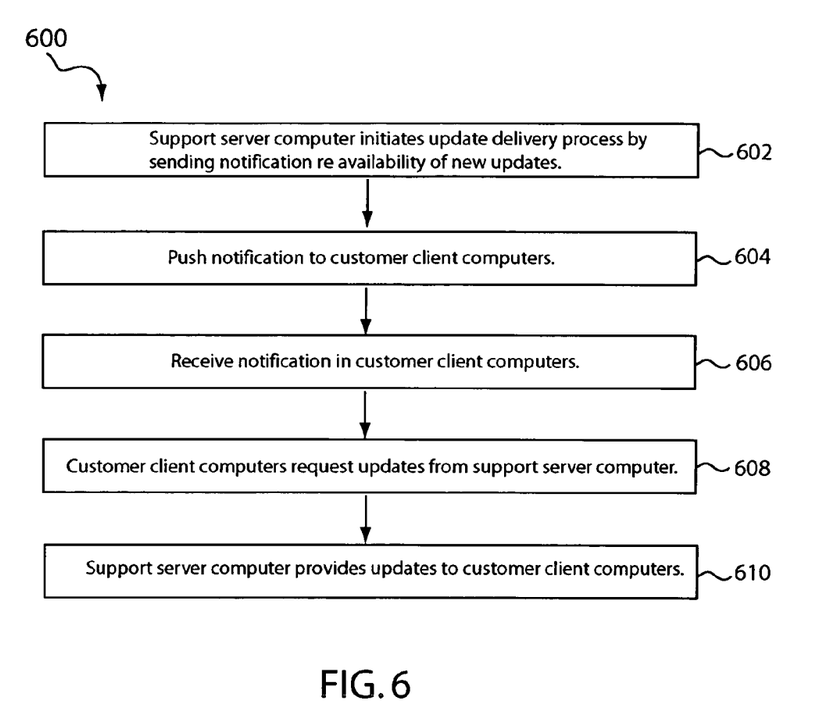
FIG. 6 shows a flow diagram of a method of distributing updates to antivirus programs in accordance with an embodiment of the present invention.

Referring now to FIG. 6, there is shown a flow diagram of a method 600 of distributing updates to antivirus programs in accordance with an embodiment of the present invention. The method 600 may be performed in the computing environments 200 or 400, for example. The method 600 may also be performed in other computing environments without detracting from the merits of the present invention.

In step 602, an antivirus support server computer initiates an update delivery process by sending notification regarding availability of new updates to antivirus programs in customer client computers. By having the support server computer (rather than the customer client computers) initiate the update delivery process, timely updates may be delivered to customer client computers.

In step 604, the support server computer pushes the notification to customer client computers. By "pushing" it is meant that the support server computer provides the notification to the customer client computers without the customer client computers requesting for the notification. For example, the notification may be pushed to the customer client computers using instant messaging as in the computing environment 200 or using a short message service as in the computing environment 400. As will be more apparent below, the notification may also be pushed to customer client computers using other customer client computers.

In step 606, the notification is received in the customer client computers.

In step 608, in response to receiving the notification, the customer client computers request updates from the support server computer. As can be appreciated, the pushing of the notification to the client computers allows the client computers to request for updates as soon as they become available for download.

In step 610, the support server computer provides the updates to customer client computers that requested for them. Each customer client computer that receives an update from the support server computer may use the update to keep its antivirus program current.

Figure 7:
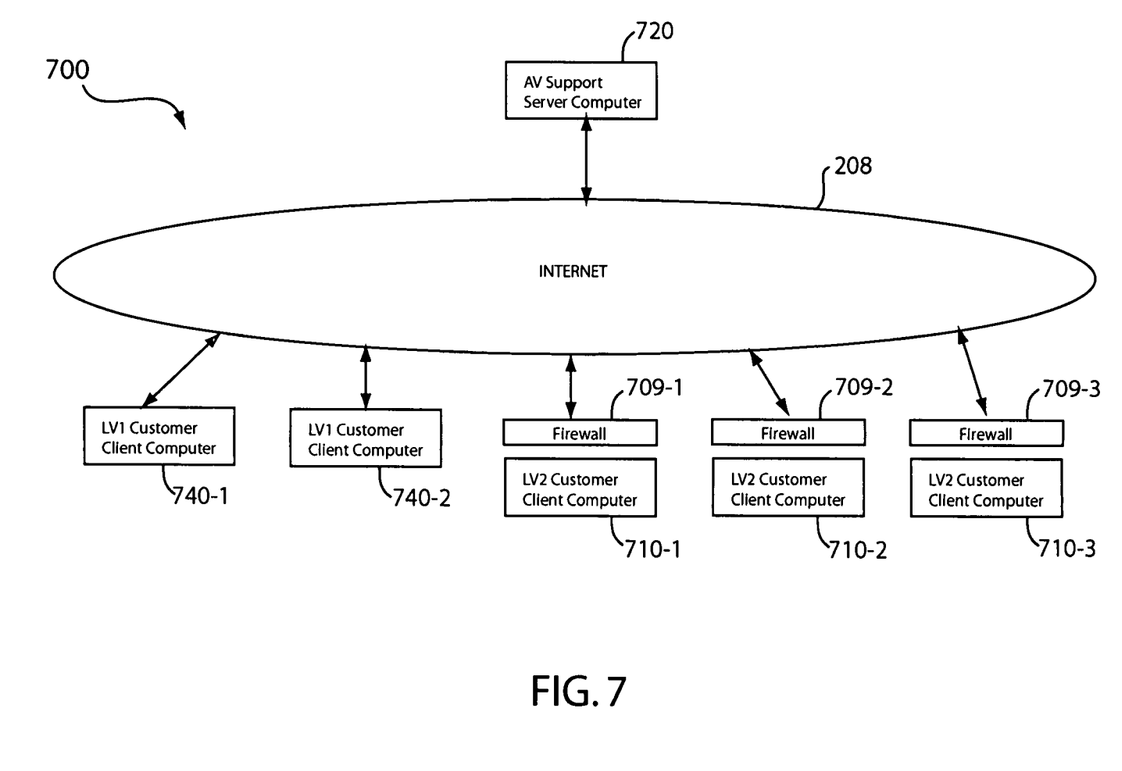
FIG. 7 schematically shows yet another computing environment in accordance with an embodiment of the present invention.

Referring now to FIG. 7, there is shown a computing environment 700 in accordance with an embodiment of the present invention. The computing environment 700 may include an antivirus support server computer 720, level 1 customer client computers 740 (i.e. 740-1, 740-2, . . . ), and level 2 customer client computers 710 (i.e., 710-1, 710-2, . . . ). Only one support server computer 720 is shown in the example of FIG. 7 for clarity of illustration. The computers of environment 700 may communicate with one another over the public computer network 208, which in the example of FIG. 7 comprises the Internet.

As in the case of computing environments 200 and 400, each of the level 2 customer client computers are behind a firewall 709 or other network security mechanism. This prevents the support server computer 720 from directly pushing notifications to the level 2 customer client computers 710. Level 1 customer client computers 740, on the other hand, are not behind a firewall and are able to receive notifications pushed by the support server computer 720. Some embodiments of the present invention take advantage of the availability of customer client computers that are not behind a firewall (or other network security mechanism) to push notifications to customer client computers that are behind firewalls. For example, the level 2 customer client computer 710-1 may initiate a connection to the level 1 customer client computer 740-1. Because this connection is initiated by the level 2 customer client computer 710-1, the firewall 709-1 will allow a two-way communication between the level 1 and level 2 customer client computers over this connection. When new updates become available, the support server computer 720 may push a notification to the level 1 customer client computer 740-1, which in turn may forward the notification to the level 2 customer client computer 710-1. In response to the received notifications, the level 1 customer client computer 740-1 and the level 2 customer client computer 710-1 may then proceed with getting the updates from the support server computer 720.

Figure 8A:
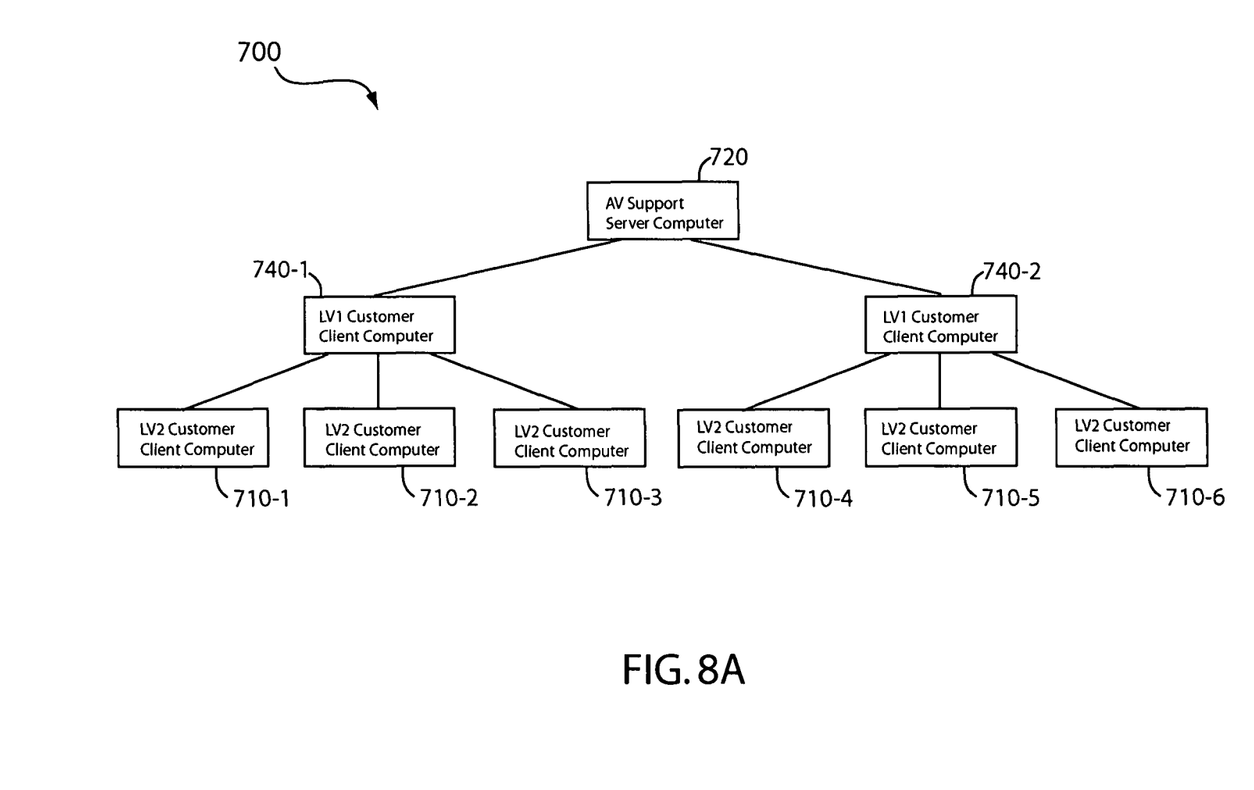
FIG. 8A shows a hierarchical diagram of the computing environment of FIG. 7 in accordance with an embodiment of the present invention.

FIG. 8A shows a hierarchical diagram of the computing environment 700 in accordance with an embodiment of the present invention. As shown in FIG. 8A, the support server computer 720 may serve several customer client computers. The support server computer 720 is configured to push notifications to level 1 customer client computers 740. Each level 1 customer client computer 740, in turn, is assigned to forward notifications received from the support server computer 720 to one or more designated level 2 customer client computers 710. In the example of FIG. 8A, the level 1 customer client computer 740-1 is assigned to forward notifications to the level 2 customer client computers 710-1, 710-2, and 710-3. Similarly, the level 1 customer client computer 740-2 is assigned to forward notifications to the level 2 customer client computers 710-4, 710-5, and 710-6.

Figure 8B:
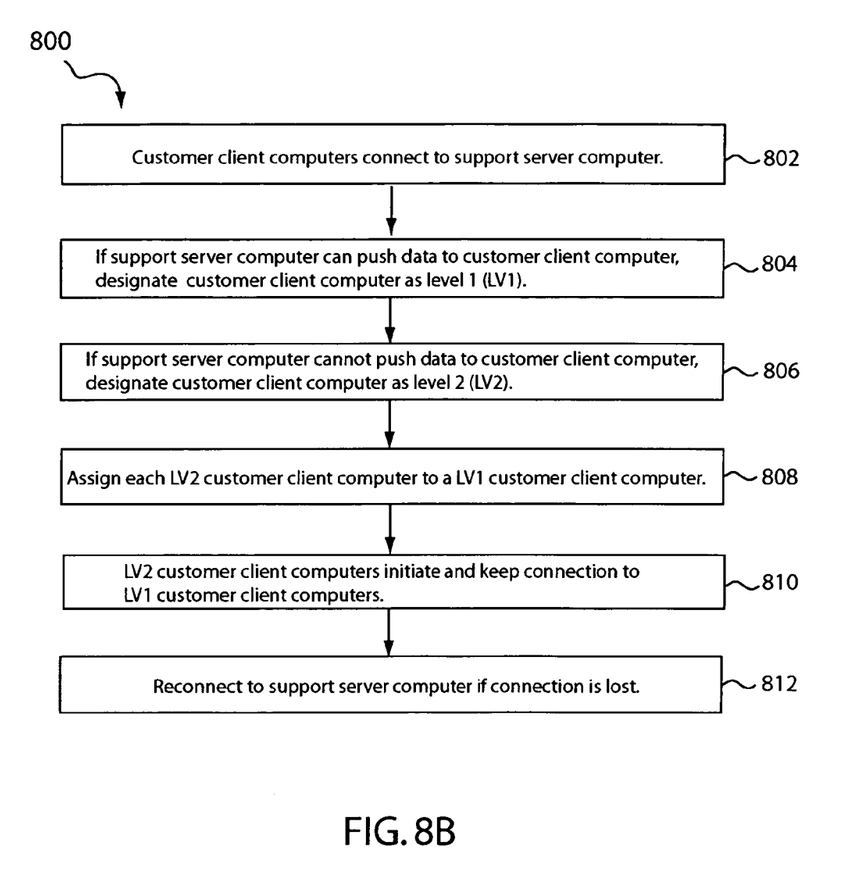
FIG. 8B shows a flow diagram of a method of configuring customer client computers to receive notifications from a support server computer in accordance with an embodiment of the present invention.

FIG. 8B shows a flow diagram of a method 800 of configuring customer client computers to receive notifications from a support server computer in accordance with an embodiment of the present invention. The method 800 may be performed in the computing environment 700 to allow customer client computers to receive notifications about availability of updates for antivirus programs from the support server computer 720.

In step 802, customer client computers connect to an antivirus support server computer. The support server computer may be configured to provide updates to antivirus programs in the customer client computers.

In step 804, customer client computers that can receive pushed data from the support server computer are designated as level 1 customer client computers.

In step 806, customer client computers that cannot receive pushed data from the support server computer are designated as level 2 customer client computers. Level 2 customer client computers are those that are behind firewalls or other network security mechanism, for example.

In step 808, the support server computer assigns each level 2 customer client computer to a level 1 customer client computer. As will be more apparent below, a level 1 customer client computer may forward notifications received from the support server computer to one or more designated level 2 customer client computers.

In step 810, the level 2 customer client computers initiate and keep connections to designated level 1 customer client computers. Because these connections are initiated by the level 2 customer client computers, a firewall protecting a level 2 customer client computer will allow a two-way communication between the level 2 customer client computer and its designated level 1 customer client computer.

In step 812, in the event a connection between a level 2 customer client computer and a level 1 customer client computer is lost, the level 2 customer client computer may reinitiate connection to the level 1 customer client computer. If the level 2 customer client computer fails to reconnect to the level 1 customer client computer, the level 2 customer client computer may connect to the support server computer 720 to get assigned to another level 1 customer client computer.

Figure 9A:
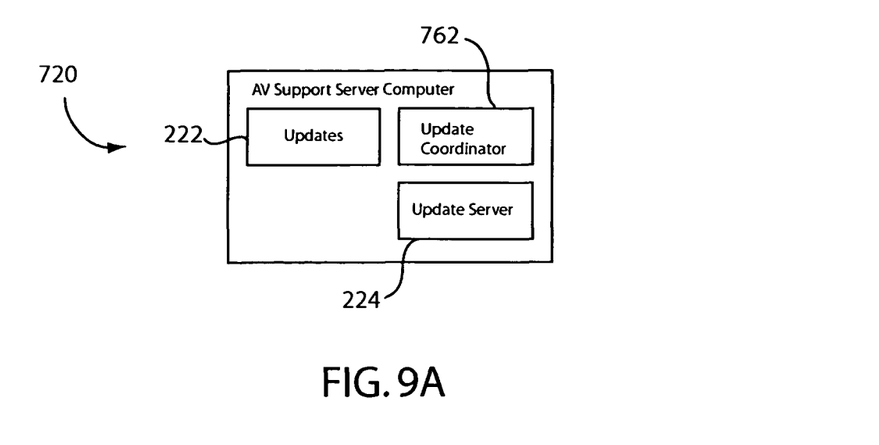
FIGS. 9A and 9B schematically show the components of an antivirus support server computer and a customer client computer, respectively, in accordance with an embodiment of the present invention.
Figure 9B:
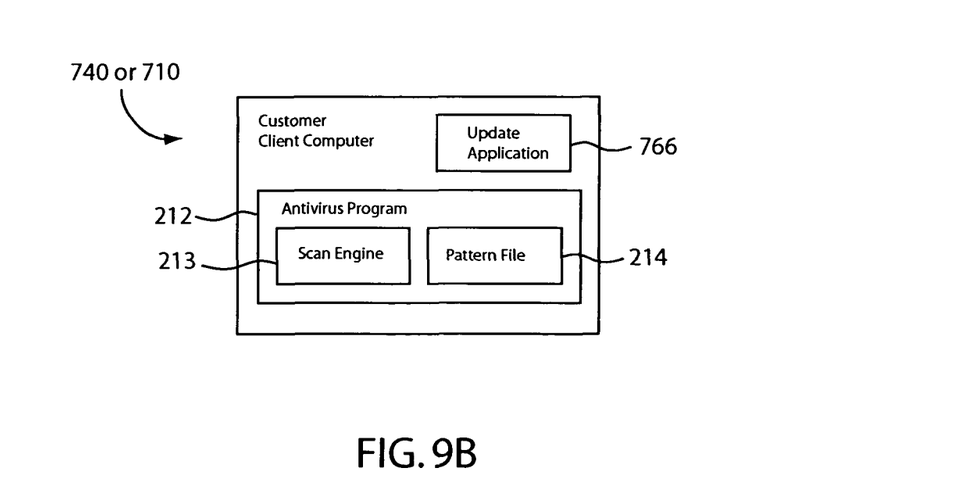

FIGS. 9A and 9B schematically show the components of an antivirus support server computer 720 and a customer client computer 710 or 740 in accordance with an embodiment of the present invention. As shown in FIG. 9A, the support server computer 720 may comprise an update coordinator 762 and the previously described updates 222 and update server 224. The update coordinator 762 may comprise computer-readable program code for categorizing customer client computers, assigning level 2 customer client computers to level 1 customer client computers, keeping track of the categories of the customer client computers, and forwarding notifications from the support server computer to level 1 customer client computers. In one embodiment, the update coordinator 762 categorizes each connecting customer client computer as either level 1 or level 2 depending on whether the support server computer can push notifications to the customer client computer. If so, the update coordinator 762 deems the customer client computer as level 1; otherwise, the customer client computer is deemed level 2. The update coordinator 762 may assign each level 2 customer client computer to connect to a designated level 1 customer client computer. The update coordinator 762 may keep track of the categories of the customer client computers and the matching level 1 and level 2 customer client computers. The update coordinator 762 may employ a table for such tracking functions, for example.

As shown in FIG. 9B, a customer client computer 740 or 710 may comprise an update application 766 and the previously described antivirus program 212 comprising a scan engine 213 and a pattern file 214. An update application 766 may comprise computer-readable program code for facilitating receipt of notifications from the update coordinator 762, for communicating with other update applications 766, for keeping track of the category of the customer client computer, and keeping track of matching customer client computers. In one embodiment, the update application 766 allows the customer client computer to communicate with the update coordinator 762 to get its category (either level 1 or level 2) and assigned matching customer client computer. In one embodiment, a human user may enter in the configuration of the update application 766 whether the customer client computer is behind a firewall or not. Such information may be passed by the update application 766 to the update coordinator 762. If the customer client computer is categorized as level 1, the update coordinator 762 informs the update application 766 information (e.g. IP addresses) about level 2 client computers to which notifications should be forwarded. If the customer client computer is categorized as level 2, the update coordinator informs the update application 766 information (e.g. IP address) about level 1 client computers to which it should initiate connection to be able to receive notifications. In one embodiment, an update application 766 in one customer client computer communicates with another update application 766 in another customer client computer using peer-to-peer protocol. Other suitable protocols for communication between two client computers may also be used without detracting from the merits of the present invention.

Figure 10:
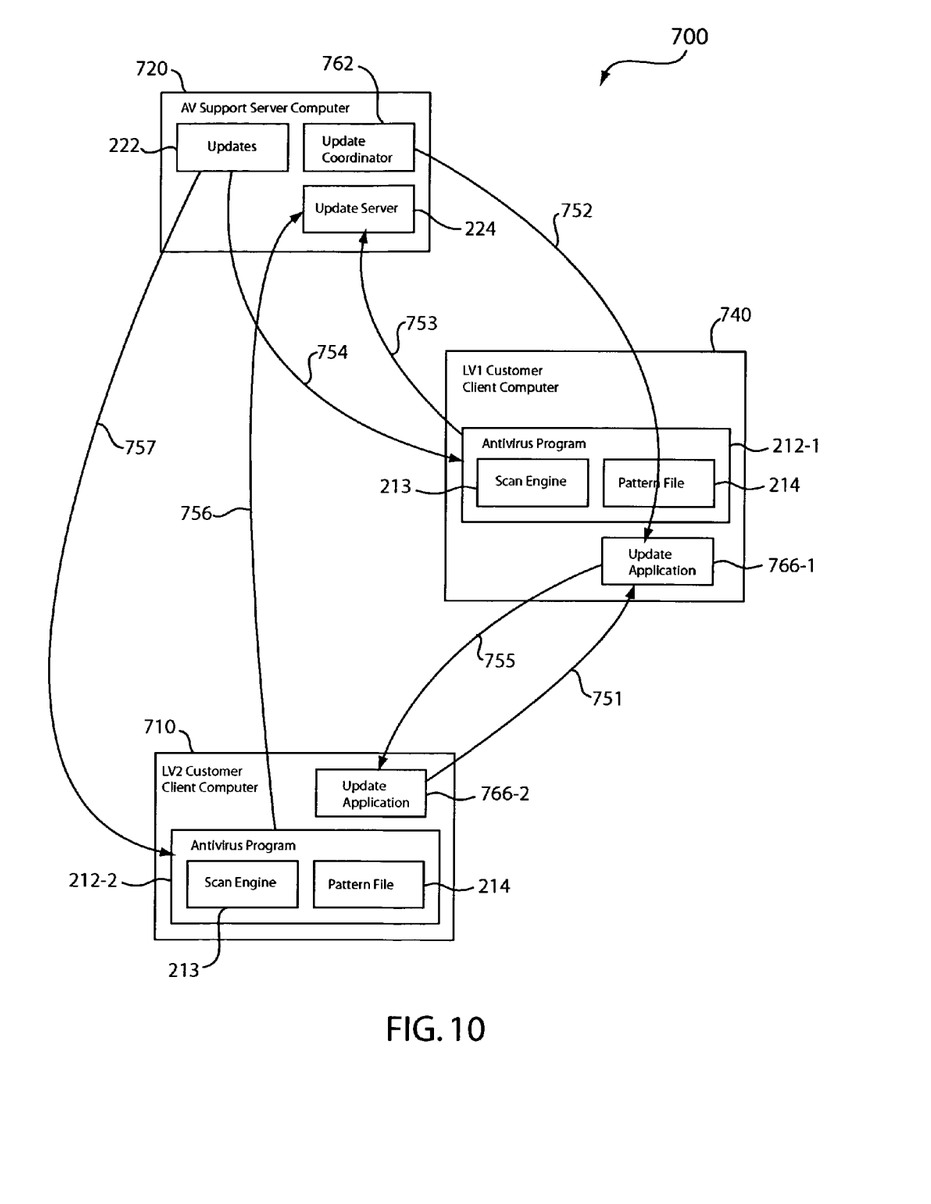
FIG. 10 shows a flow diagram of an update delivery process in the computing environment of FIG. 7 in accordance with an embodiment of the present invention.

Referring now to FIG. 10, there is shown a flow diagram of an update delivery process in the computing environment 700 in accordance with an embodiment of the present invention. In the example of FIG. 10, communications between the computers shown are over the Internet (see FIG. 7). In one embodiment, the update application 766-2 automatically starts up upon boot-up of the level 2 customer client computer 710. Upon launching, the update application 766-2 initiates and maintains a connection to the update application 766-1 in the level 1 customer client computer 740 (arrow 751). The update application 766-1 may check its tables to verify that the level 2 customer client computer 710 is allowed to connect to it. Because the connection is initiated by the level 2 customer client computer, a firewall 709 (see FIG. 7) allows a two way communication between the customer client computers 710 and 740.

When new updates 222 become available for download from the support server computer 720, the update server 224 sends out a notification about the availability of the new updates 222 using the update coordinator 762. The notification may be in text or other form understandable to an antivirus program 212 (i.e. 212-1, 212-2, . . . ). The update coordinator 762 forwards the notification to the update application 766-1 in the level 1 customer client computer 740 (arrow 752). The update application 766-1 forwards the notification to the antivirus program 212-1 running in the level 1 customer client computer 740. Recognizing the notification, the antivirus program 212-1 sends out a request for the updates 222 to the update server 224 (arrow 753). In response, the update server 224 provides the updates 222 to the antivirus program 212-1 (arrow 754).

Upon receipt of the notification from the update coordinator 762, the update application 766-1 forwards the notification to the update application 766-2 in the level 2 customer client computer 710 (arrow 755). The update application 766-2 forwards the notification to the antivirus program 212-2 running in the level 2 customer client computer 710. Recognizing the notification, the antivirus program 212-1 sends out a request for the updates 222 to the update server 224 (arrow 756). In response, the update server 224 provides the updates 222 to the antivirus program 212-2 (arrow 757).

Figure 11:
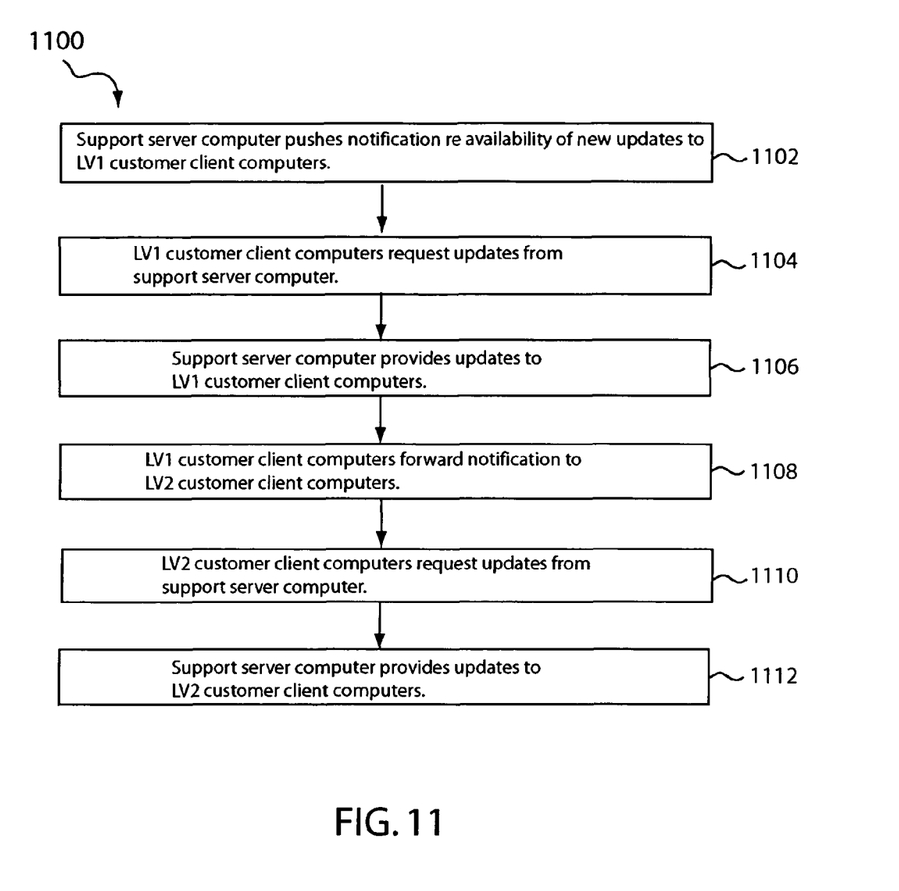
FIG. 11 shows a flow diagram of a method of delivering updates to antivirus programs in accordance with an embodiment of the present invention.

FIG. 11 shows a flow diagram of a method 1100 of delivering updates to antivirus programs in accordance with an embodiment of the present invention. The method 1100 may be performed in the computing environment 700, for example. The method 1100 may also be performed in other computing environments without detracting from the merits of the present invention.

In step 1102, an antivirus support server computer pushes notifications regarding availability of new updates to level 1 customer client computers.

In step 1104, in response to receiving the notifications, the level 1 customer client computers request updates from the support server computer.

In step 1106, in response to the requests from the level 1 customer client computers, the support server computer provides the updates to the level 1 customer client computers.

In step 1108, the level 1 customer client computers forward the notifications to level 2 customer client computers.

In step 1110, in response to receiving the notifications, the level 2 customer client computers request updates from the support server computer.

In step 1112, in response to the requests from the level 2 customer client computers, the support server computer provides the updates to the level 2 customer client computers.

As can be appreciated, the method 1100 allows for timely delivery of notifications to customer client computers behind firewalls using other customer client computers. This advantageously allows for pushing of notifications to customer client computers without having to setup and maintain intermediate servers. To encourage level 1 customer client computers to participate in the notification delivery, the antivirus vendor may provide incentives such as free updates, for example.

Improved methods and apparatus for delivering updates of antivirus programs to customer client computers have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computing environment for delivering updates to antivirus programs, the computing environment comprising:

an antivirus support server computer configured to provide an update over the Internet to antivirus programs resident in a first set of customer client computers, the antivirus support server computer being configured to send a notification to an intermediary apparatus that will forward the notification to the first set of customer client computers when the update becomes available for download over the Internet;

wherein each customer client computer in the first set of customer client computers are behind a network security mechanism that prevents the customer client computer from receiving data over connections on the Internet not initiated by the customer client computer and wherein the notification comprises information indicative of availability of the update from the antivirus support server computer.

2. The computing environment of claim 1 wherein the intermediary apparatus provides short messaging service (SMS) to the antivirus support server computer and the first set of customer client computers.

3. The computing environment of claim 1 wherein the intermediary apparatus provides instant messaging service to the antivirus support server computer and the first set of customer client computers.

4. The computing environment of claim 1 wherein the intermediary apparatus comprises a customer client computer that is able to receive pushed data from the antivirus support server computer.

5. The computing environment of claim 1 wherein the network security mechanism comprises a firewall.

* * * * *